(12) United States Patent
Allender et al.

(10) Patent No.: US 6,483,557 B1
(45) Date of Patent: Nov. 19, 2002

(54) EMISSION CONTROL IN A VIDEO DISPLAY

(75) Inventors: Jeffrey Owen Allender, Morristown; Dal Frank Griepentrog, Indianapolis; Brian Jonathan Cromarty, Noblesville, all of IN (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/434,529

(22) Filed: Nov. 5, 1999

(51) Int. Cl.[7] .............................. H04N 5/68; H04N 5/21
(52) U.S. Cl. .................. 348/805; 348/626; 348/380
(58) Field of Search ................... 348/626, 379, 348/380, 805; H04N 5/21, 5/68

(56) References Cited

U.S. PATENT DOCUMENTS

| | | | |
|---|---|---|---|
| 4,118,731 A | 10/1978 | Hinn | 358/65 |
| 4,167,025 A | 9/1979 | Willis | 358/243 |
| 4,207,592 A | 6/1980 | Harwood | 358/34 |
| 4,587,554 A | * 5/1986 | Tamura | 348/380 |
| 4,599,643 A | 7/1986 | Harlan | 358/74 |
| 4,689,668 A | 8/1987 | Sutherland, II et al. | 358/74 |
| 5,313,294 A | 5/1994 | Haferl | 348/377 |
| 5,587,745 A | * 12/1996 | Griepentrog | 348/626 |

OTHER PUBLICATIONS

PCT/US98/27126, filed Dec. 21, 1998, Automatic Screen Saver, (RCA 88845).

* cited by examiner

*Primary Examiner*—Sherrie Hsia
(74) *Attorney, Agent, or Firm*—Joseph S. Tripoli; Harvey D. Fried; Francis A. Davenport

(57) ABSTRACT

Unintentional emissions are controlled responsive to the spectral content of the display signal. A video display apparatus comprises a cathode ray tube responsive to a video signal. A processor controls a bandwidth of the video signal coupled to the cathode ray tube in response to an emission control signal. A generating device is coupled to the processor for generating the emission control signal responsive to a component of the video signal.

12 Claims, 3 Drawing Sheets

EMISSION CONTROL IN A VIDEO DISPLAY

This invention relates generally to the field of video displays, and more particularly to an arrangement employed therein to detect and control generation of unwanted emissions.

BACKGROUND OF THE INVENTION

It is well known that electronic circuitry comprising image display apparatus can exhibit electronic characteristics which generate unwanted signal components that can degrade the displayed image or acoustic output signal. Many methods are known for linearizing circuit operation or reducing harmonic generation to prevent impairment of the audio or visual performance of the device. However, these efforts are directed to the prevention of degraded display performance with little or no regard to unwanted or unintentional emissions emanating from the display device.

A recently introduced Federal Communications Commission rule, 47 CFR §15 subpart B, Unintentional Radiators, mandates levels of radiation for various electronic products including, for example, TV broadcast receivers, TV interface devices, cable system terminal devices, other receivers, personal computers and peripheral equipment. Specifically, all TV broadcast receivers offered for sale in the United States must comply with section rule 47 CFR §15.117.

Although engineering efforts have been directed to the improvement of display image quality by the elimination of spurious image degrading artifacts, the desire to achieve the enhanced performance provided by the ATSC standards requires, among other things, wider circuit bandwidth and with attendant high frequency signal currents and voltages. Such wider bandwidth signals, while necessary to provide the desired level of enhanced performance, can unfortunately and inherently result in unintentional emissions with levels greater than those mandated by the FCC.

SUMMARY OF THE INVENTION

Unintentional emissions are controlled responsive to the spectral content of the display signal. A video display apparatus comprises a cathode ray tube responsive to a video signal. A processor controls a bandwidth of the video signal coupled to the cathode ray tube in response to an emission control signal. A generating means is coupled to the processor for generating the emission control signal responsive to a component of the video signal.

DETAILED DESCRIPTION

Figure 1A:
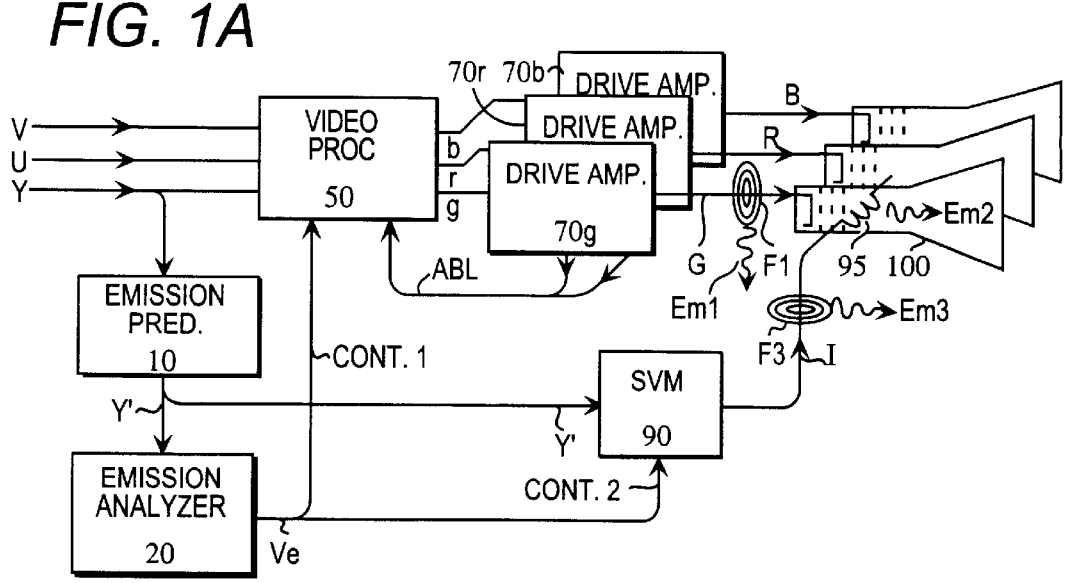
FIG. 1A–C is a block diagram depicting an inventive arrangement for detecting and controlling unwanted emissions in an image display device, with FIGS. 1D and 1E illustrating specific details.

FIG. 1A is a block diagram depicting part of an image display device employing three cathode ray tubes, as found in a projection television, and including inventive arrangements for detecting and controlling unwanted emissions. Although FIG. 1A depicts three CRTs, the problem and inventive solution to be explained is equally applicable to a display device with a single CRT. Video component signals representing, for example luminance and color difference signals, Y, U and V are supplied to video processor 50 from a source, not shown, for example, a base band input connection, a demodulator output, or a multiplex decoder. Video processor block 50, can provide a plurality of video signal processing functions. As indicated, for example, block 50 transforms video component signals Y, U and V, to component signals r, g and b which are ultimately coupled to cathode ray tubes 100 for display. The multiple processing functions provided by video processor 50 can be facilitated by an integrated circuit arrangement, for example Toshiba type TA1276. Video processor 50 is depicted coupled to a data bus, for example, employing I²C protocol, which can provide data and control values, controlled or generated by a microprocessor system 30. Microprocessor 30, data bus 35 and signal path Ve' are shown and explained with reference to FIGS. 1B and 1C.

Video processor 50 is depicted with an input signal, (ABL) that facilitates control of beam current magnitude, by providing negative feedback indicative of electron beam currents conducted by each cathode of the CRTs. The derivation of signal ABL is well known. Within processor 50, signal ABL controls the amplitude of output signals g r and b which are coupled to kinescope drive amplifiers 70g, 70r and 70b. Kinescope drive amplifiers 70g, 70r and 70b amplify the input signals forming signals G, R and B having exemplary amplitudes in the order of 150 Volts peak to peak and signal bandwidths of approximately 20 MHz. Thus, it may be appreciated that such signals of wide bandwidth and large signal amplitude are susceptible to coupling and conduction beyond the confines of the associated tube and drive circuitry. It is typical for kinescope drive amplifiers 70g, 70r and 70b to be mounted on a circuit board physically located at or adjacent to the CRT socket. Such component positioning represents an attempt to optimize circuit performance while minimizing losses due to unwanted coupling. Although exemplary green signal G can be connected via a minimal path length, for example 2 centimeters or less, significant signal radiation can nevertheless result, not only from the conductive path but also from the CRT metallic electrodes. These exemplary, radiated fields and emissions are depicted in FIG. 1A by concentric circles F1 surrounding the amplifier output conductor and damped sinusoidal emissions Em1. However, radiation or emission can also occur as a result of coupling between CRT electrodes resulting, for example in emission Em2 emanating from the CRT. However, for the sake of clarity, these emission fields are illustrated only in the green channel.

Figure 2A:
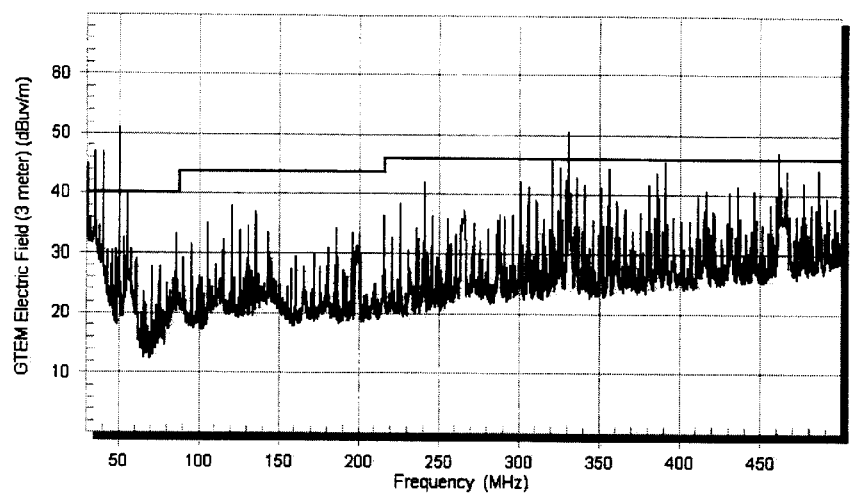
FIGS. 2A and B are frequency spectrum plots showing measured emission performance without the inventive arrangements of FIG. 1A.

FIG. 2A illustrates unintentional radiation spectrum, measured in accordance with the FCC specified methods and shows radiated energy generally resulting from signal coupling between the CRT drive amplifiers and CRT electrodes. This unintentional radiation spectrum is illustrated to approximately 500 MHz with a measurement graticule showing maximum permitted radiated signal levels. FIG. 2A reveals spectral components having frequency components that exceed the permitted level in the region of 50 MHz.

The partial block diagram of FIG. 1A also depicts block 90, which includes scanning velocity modulation circuitry that forms signals to enhance the perceived sharpness of the displayed image. The principles of scanning velocity modulation are well known. However, the scanning velocity of the CRT electron beam is perturbed by current impulses I, that are coupled to SVM deflection coil 95 to produce the required velocity modulating deflection field. The impulsive SVM current I can have a magnitude in the order of 1 ampere and a maximum repetition rate in the range of 15 MHz.

Figure 2B:
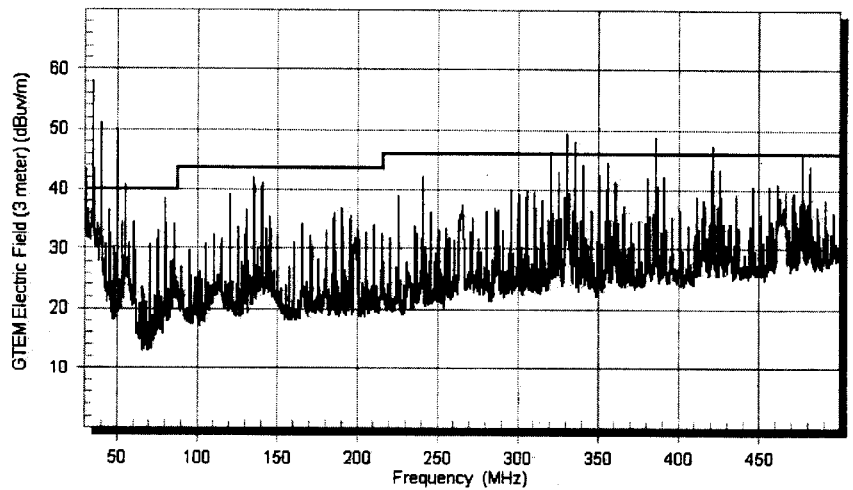
FIG. 2C is a frequency spectrum plot showing measured emission performance with the inventive arrangements.

As is the case with the kinescope drive amplifiers, the SVM coil driver amplifier or amplifiers are also located on the CRT socket circuit board. Usually the coil driver amplifier is coupled to the SVM coil by wires to optimize SVM performance while minimizing coupling losses. However, the combined effect of SVM deflection coil, the coupling wires and attendant parasitic capacitance can form an antenna capable of significant SVM signal radiation. Thus an exemplary SVM signal I is radiated as depicted in FIG. 1A by concentric circles F3 surrounding the conductor to coil 95, and by damped sinusoidal emission Em3. FIG. 2B illustrates an unintentional radiation spectrum generally resulting from both SVM coil and modulation current, and CRTs and video drive signals. The spectrum is illustrated to approximately 500 MHz and reveals various spectral components that exceed the mandated measurement graticule levels.

To achieve the enhanced video display performance required by the ATSC standards has required wider circuit bandwidth and with attendant high frequency signal currents and voltages. An inherent consequence of these higher performance signals can be the generation of unintentional emissions as prohibited by the FCC. Thus, although careful attention to circuit design and physical layout can significantly reduce the generation and or radiation of unwanted emissions, the actual display signal can contain image detail of sufficient magnitude and spectral content as to increase the likelihood of unintentional emission by the mechanisms described previously. For example, a page of static text, having approximately 200 characters across the screen and displaying an upper case letter H, possesses both high signal amplitude and extreme spectral content which are sufficient to result in unintentional emissions. Similarly video display images containing high amplitude brightness alternations can also produce similar problem signals particularly if the image is subjected to size variation, for example by means of an optical zoom which can be considered to yield a swept frequency spectra.

The block diagram of FIG. 1A includes an inventive emission control arrangement facilitated by an emission prediction block 10 and emission analyzer block 20. This control arrangement provides two feed forward control loops, CONT. 1, for the control of video parameters, such as video amplitude or bandwidth in video processor 50 and CONT. 2 for feed forward control of control of SVM signal amplitude or frequency response in SVM block 90. Although FIG. 1A depicts three CRTs, each with an SVM amplifier and coil these are, for the sake of clarity, not shown. However the problem and inventive solution to be explained is equally applicable to a display device with a single CRT and SVM coil.

Operation of the inventive emission control arrangement is as follows. An exemplary luminance component Y of the display signal is coupled to emission prediction block 10, which processes the Y signal to form an output emission prediction signal Y'. Unwanted emissions typically result from rapid edge transitions in the display image signal, which as a consequence, contain harmonically related spectral products of significant amplitude. Hence, emission prediction block 10 processes luminance component Y to determine and extract edge information likely to generate unwanted emissions. The. extraction of edge information is known from methods employed for video image sharpening applied, for example, to video signal processing or modulation of scanning velocity. Exemplary differentiation, band shaping filters or delay line pulse formation techniques can be used to form a signal Y' representative of image edge transitions, or the high frequency spectra comprising edges occurring in luminance signal component. Advantageously, emission prediction signal Y', can be coupled to form a scanning beam velocity modulation signal at block 90. SVM block 90 processes signal Y' further, for example, to facilitate peak clipping, noise coring and to enable amplitude control responsive to power dissipation in an output drive amplifier of block 90 generating current pulses I for coupling to SVM coil 95.

Figure 2C:
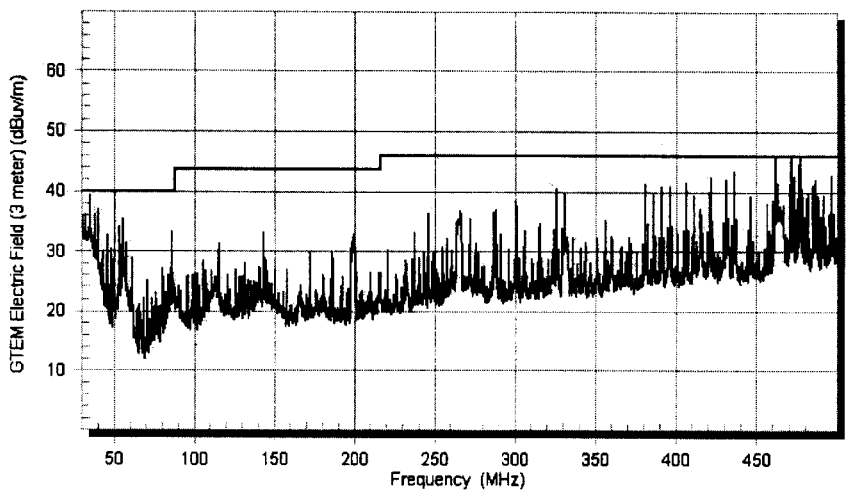

Emission prediction signal Y' from block 10 is coupled to an inventive emissions analyzer, block 20, which analyzes the spectral composition of signal Y' and generates control signal Ve responsive to the amplitude and spectral composition. Control signal Ve is applied as an open loop, feed forward control signal, forming control signal CTRL. 1 for video parameter control in video processor block 50. In addition emission signal Ve is applied as CTRL. 2 to SVM block 90 to provide feed forward, open loop amplitude control of the SVM signal driving coil 95. Use of the inventive control signal applied to control emissions from both kinescope and SVM circuitry is illustrated in FIG. 2C which shows the absence of spectral components that exceed the mandated maxima indicated by the measurement graticule.

Figure 3:
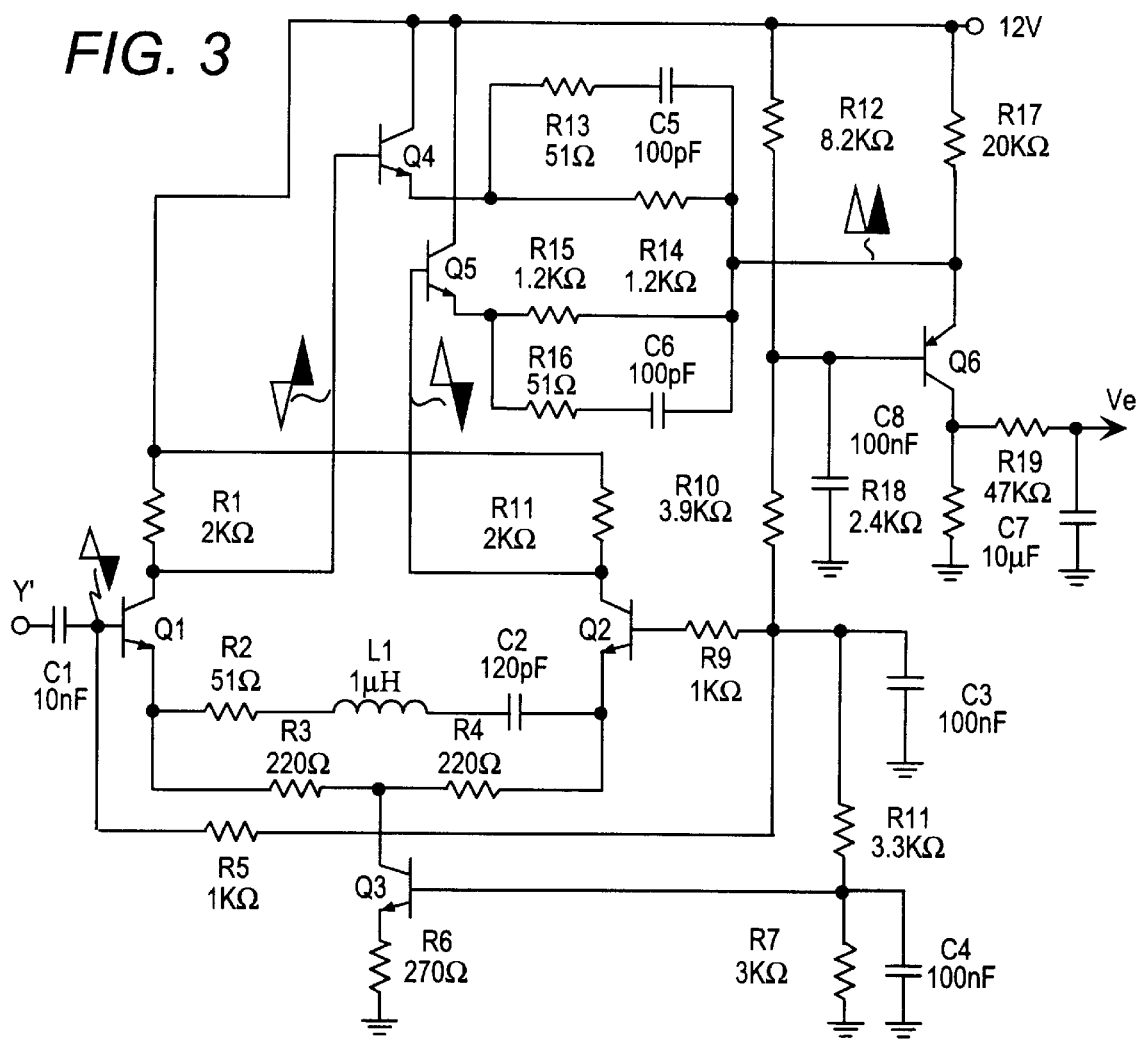
FIG. 3 illustrates an inventive arrangement for detecting and generating an emission control signal.

FIG. 3 shows an inventive arrangement which analyzes the amplitude and spectral content of the emission prediction signal Y' input for emission analysis. The arrangement of FIG. 3 generates a DC signal Ve that provides an open loop feed forward control signal for control of display circuitry likely to generate unwanted emissions with certain display signal inputs. In FIG. 3, prediction signal Y' is coupled via a capacitor C2 to the base of NPN transistor Q1. Transistors Q1 and Q2 are NPN transistors configured as a differential amplifier. The base of transistor Q1 is also coupled via series connected resistors R5 and R9 to the base of transistor Q2. A potential divider is formed by resistors R7, R11, R10 and R12. Resistor R12 is connected to a positive supply, for example 12 volts, and resistor R7 is connected to ground. The junction of resistors R5 and R9 is connected to the junction of resistors R10 and R11 of the potential divider to provide a biasing potentials of approximately 4 volts for the bases of transistors Q1 and Q2. The potential divider generates approximately 2 volts for the base of current source transistor Q3 and approximately 6.5 volts for the base of output transistor Q6. The junction of potential divider resistors R12 and R10 is AC coupled to ground by capacitor C8. The junction of resistors R10 and R11 is AC coupled to ground by capacitor C3 and resistors R11 and R7 are decoupled to ground by capacitor C4. The emitter of current source transistor Q3 is connected to ground via resistor R6 with the collector supplying current to the junction of gain determining resistors R3 and R4 which are coupled in series between the emitters of transistors Q1 and Q2. A frequency selective network is formed by inductor L1 capacitor Q1 and damping resistor R2, connected as a series tuned circuit or filter, coupled in parallel with gain determining resistors R3 and R4 of the differential amplifier. Thus the gain of the differential amplifier is progressively increased from a value determined by resistors R3 and R4, to a maximum value approximately nine times greater as the series tuned circuit, or bandpass filter, formed by inductor L1 and capacitor C1 approaches series resonance at approximately 15 MHz. The collectors of differential amplifier transistors Q1 and Q2 are connected to the positive supply by load resistors R1 and R11 across which a frequency dependent output signal is formed. Thus input signal Y' is selectively amplified with signal frequency components occurring within the bandwidth of the bandpass filter receiving greater amplification than frequency components falling outside the filter bandwidth.

The selectively amplified components appear in antiphase at the collectors of transistors Q1 and Q2 and are coupled to bases of respective NPN emitter followers Q4 and Q5. The collectors of transistors Q4 and Q5 are connected to the power supply and the emitters are each coupled to the emitter of current source transistor Q6 via frequency selective networks. Thus transistors Q4 and Q5 may be considered to function as a full wave rectifier supplying positive signal currents to the emitter of transistor Q6. The frequency selective network of transistor Q4 comprises a series resistor R14, coupled in parallel with a resistor R13 and a capacitor C5 connected in series. A similar network in the emitter of transistor Q5 comprises series resistor R15, coupled in parallel with a resistor R16 and a capacitor C6. The series connected resistor and capacitor allow higher frequency signal components to bypass emitter load resistors R14 and R15 respectively. The emitter of transistor Q6 is coupled to the positive supply via resistor R17 with the collector connected to ground by resistor R18. The base of current source transistor Q6 is biased at about 6.5 volts from the junction of resistors R12 and R10 which results in emitter followers Q4 and Q5, coupled to the emitter of transistor Q6, conducting only on positive signal components having sufficient amplitude to overcome the emitter potential of transistor Q6. Hence by combining frequency selectivity and processed signal amplitude, only display signals of specific magnitude and spectral composition will cause the generation of the emission control signal Ve. The arrangement of transistors Q4, Q5 and Q6 may be considered to function as a fullwave rectifier charging capacitor C7 positively via resistor R19 to form emission control signal Ve. However, not only is capacitor C7 charged by both polarities of input signal Y', but control signal Ve is also responsive to the spectral composition of the signal Y'. In simple terms, the greater the number of transitions derived from display image detail, the greater will be the voltage generated across capacitor C7. In addition, Y' signal frequency components in a range about 15 MHz receive greater amplification. Thus emission control signal Ve is responsive to both positive and negative signal transitions, the rate of transition occurrence and is weighted towards control signal Ve generation for prediction signal components occurring in the range about 15 MHz.

Emission control signal Ve may be coupled as described previously to reduce or eliminate emissions by the control of either or both the display signal frequency response or signal amplitude. The control for amplitude and or frequency response can be applied to the kinescope drive signals and or the SVM drive signal.

Figure 1B:
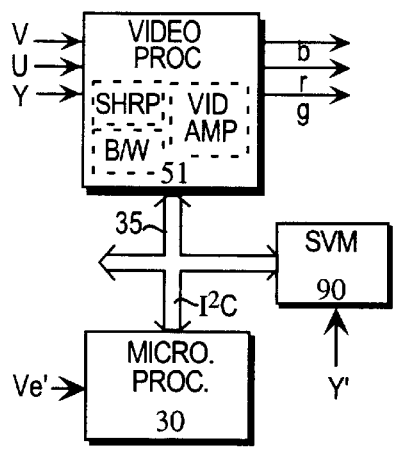

FIG. 1B represents an alternative arrangement for emission control by coupling data representative of the emission control signal values, for example signal Ve, to display subsystems, such as, video processing or SVM, capable of data bus control, for example, by use of I²C protocol. In FIG. 1B microprocessor 30 is shown connected to an exemplary I²C data bus 35 which can provide data representative of measured values and control commands. Exemplary data bus 35 is depicted connected to a video processing system 51 and to scanning velocity modulator processor 90. Signal Ve' is input to microprocessor 30 for processing and bus distribution to the exemplary bus destinations. Signal Ve' is representative of the DC emission control signal Ve, discussed with respect to FIG. 1A, and may be analog signal Ve, or may be a digital representation of signal Ve or an unfiltered form of signal Ve. Thus, microprocessor 30, can accept either an analog emission control signal for analog to digital conversion, or a digital form of emission control signal where either input signal format is coupled by bus transmission to provide control of emissions.

In FIG. 1B, video processing system 51 shows various video processing sub-systems which can be advantageously controlled to eliminate or reduce unintentional emissions. For example video signal amplitude can be controllably reduced to in response to the determination, by blocks 10 and 20, that the video signal contains spectral components likely to produce emissions beyond the permissible levels. The reduction of the amplitude of signals r, g and b produces a corresponding decrease in the amplitude of kinescope drive signals RG and B with the desired reduction in radiated spectral components.

Similarly the amplitude of radiated spectral components can be reduced by the selective amplitude reduction of the display signal components likely to be responsible for emissions. Such selective reduction in frequency component amplitude may be obtained by for example, controlled reduction of picture sharpening or peaking responsive to emission control signal Ve. A further method for emission reduction can be achieved by the controlled introduction of a lowpass frequency response network into the display signal, channel at a point following emission prediction processing.

Figure 1C:
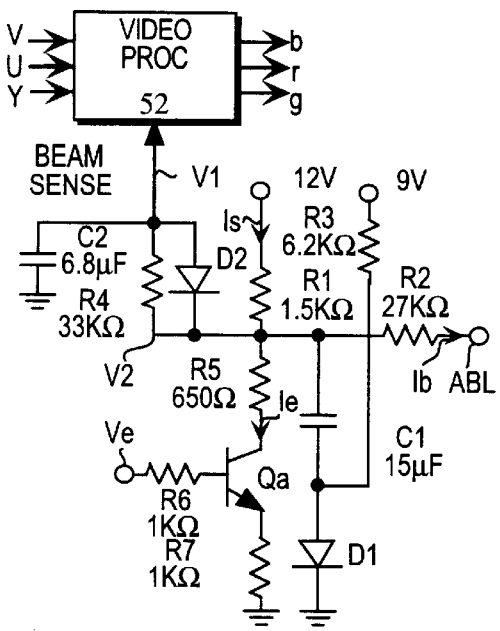

FIG. 1C illustrates in partial schematic and block diagram form, a further inventive arrangement for controlling unintentional emission. This inventive arrangement employs an open loop, feed forward control signal coupled to an automatic beam current limiter control loop. The theory and operation of an automatic beam current limiter is well known. However, in simple terms, FIG. 1C depicts current Is drawn from an exemplary, positive 12 volt supply via resistors R1 and R2 to form current Ib at terminal ABL. Current Ib is coupled to a high voltage generator, not shown, and has a magnitude representative of beam current in a ° CRT energized by the high voltage supply. At the junction of resistors R1 and R2 a voltage V2 is generated that is low pass filtered by capacitor C1 and diode D1 connected in series to ground. Diode D1 is forward biased by current supplied via resistor R3 from a positive 9 volt supply. Voltage V2 is coupled via a further low pass filter formed by resistor R4 and capacitor C2 to form beam sense voltage V1 which is applied to video processor 52 to cause a reduction in the amplitude of output signals r, g and b. Resistor R4 is connected in parallel with a diode D2 which provides a discharge path for capacitor C2. The beam sense voltage V1 is applied to video processor 52 to provide control of video signal amplitude. With the exemplary component values shown, and during normal non-beam limiting operation, voltage V2 has a value of approximately 6.5 volts or greater. Under conditions of excessive beam current, voltage V2 is reduced as a consequence of increased voltage drop across resistor R1. When voltage V2 is reduced to 4.5 volts maximum beam current limiting is achieved by controlled reduction of signal amplitudes, for example signals g, r, b generated within video processor 52 and coupled to respective drive amplifiers to form kinescope drive signals G, R and B.

Advantageously, in FIG. 1C, emission control signal Ve is coupled to the base of transistor Q1 via resistor R6. The emitter of transistor Q1 is connected to ground via resistor R7 and the collector is connected via resistor R5 to the junction of resistors R1 and R2. As described previously, emission control signal Ve becomes more positive responsive to increases in certain signal components comprising emission prediction signal Y'. Thus an increasing value of signal Ve applied to transistor Q1 base causes conduction and progressively diverts to ground, current Ie sourced via resistor R1. This additional current. drain causes an additional voltage drop across resistor R1 which forces voltage V2 to a lower value relative to ground potential. Thus a feed forward emission control signal is applied to the beam current limiter control loop to provide emission control in addition to beam current limiting.

Figure 1E:
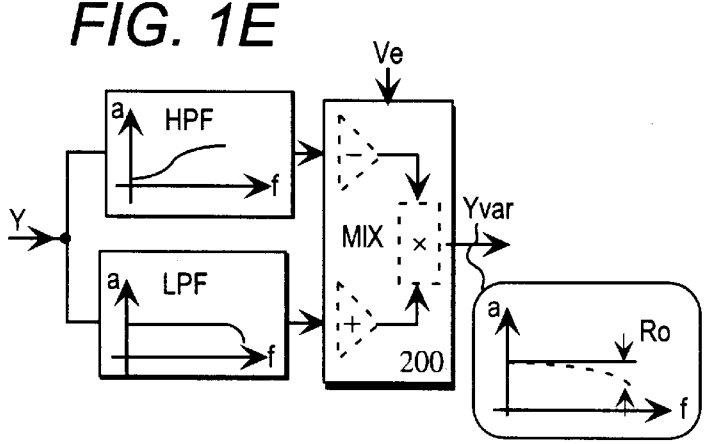
Figure 1D:
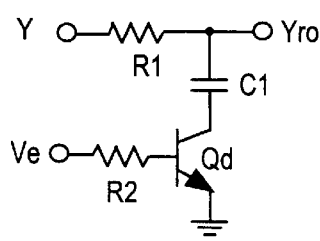

An advantageous controlled low pass filter is depicted in exemplary FIG. 1D. The low pass filter comprises a resistor capacitor filter which is activated by transistor Qd in response to emission control signal Ve. The low pass filter characteristic is obtained by frequency selective potential division of input signal Y, for example a luminance component of the display signal. However, such filtering can be applied to each individual color signal component. Low pass filtering or frequency response roll off of output signal Yro is obtained by a frequency shunting path formed by capacitor C1 controllably connected to ground via transistor Qd responsive to signal Ve.

An further advantageous low pass filter is depicted in exemplary FIG. 1E which provides variable frequency response roll off in response to the magnitude of emission control signal Ve. An exemplary luminance component Y of the display signal is depicted as an input signal however, such filtering can be applied to each individual color signal component. The exemplary input signal is coupled to a pair of filter networks LPF and HPF which produce low passed and high passed signal components respectively. The low pass characteristic is such that the input signal is passed substantially without any frequency attenuation. The high pass characteristic provides a gradual transition from the low frequency stop band to the high frequency pass band. Both filters are arranged to have similar group delay characteristics such that signals from either filter can be combined in block 200 without significant waveform distortion. Signals from the two filters are applied to mixer 200 with the high passed signals applied to an inverting input and the low passed signals applied to a non-inverting input. Emission control signal Ve is applied to mixer 200 to control the proportions of the input signals which form the output signal Yvar. Since the high passed signal is inverted, the greater the contribution of the high passed signal to the output, the greater will be the frequency roll off or bandwidth limitation in output signal Yvar.

Figure 4:
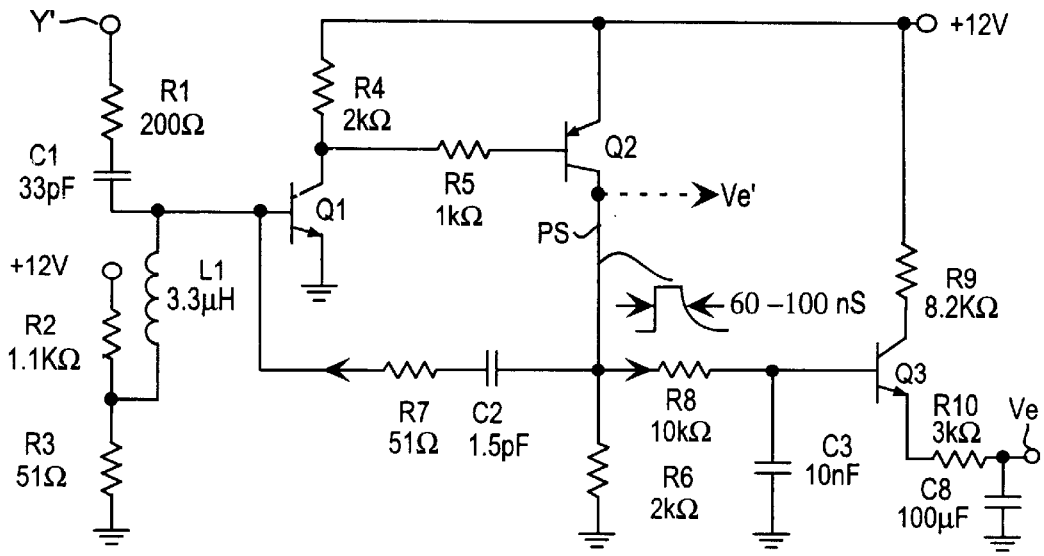
FIG. 4 illustrates an further inventive arrangement for generating an emission control signal.

FIG. 4 shows a further inventive arrangement for regeneratively generating an emission control signal Ve. Prediction signal Y' is coupled via a series resistor R1 and a capacitor C1 to the base of an NPN transistor Q1. The base of transistor Q1 is also connected to an inductor L1 which supplies a bias potential of approximately 0.5 volts from voltage divider formed by resistors R2 and R3. Resistor R2 is connected to a positive supply, for example 12 volts, with resistor R3 connected to ground. The collector of transistor Q1 is connected to the positive supply by a resistor R4 and the emitter is connected to ground. Capacitor C1 and inductor L1 form a series resonant filter with a frequency of approximately 15 MHz. Thus components of prediction signal Y' with frequencies in the range about 15 MHz are increased in amplitude by the resonant action of the series resonant circuit. Since the base of transistor Q1 is biased at approximately 0.5 volts, only positive prediction signal components with amplitudes in excess of a few hundred millivolts are sufficient to turn on the transistor. The collector of transistor Q1 is coupled via resistor R5 to the base of a PNP transistor Q1 which has the emitter connected to the positive supply and the collector connected to ground via load resistor R6. The collector transistor Q2 is also fed back to the base of transistor Q1 via a differentiating network formed by capacitor C2 and resistor R7 which provide positive feedback creating a monostable action. Thus positive Y' signal components of sufficient amplitude and or frequency range cause transistors Q1 and Q2 to assume an unstable condition for a time period of approximately 60 to 100 nano seconds, as determined by capacitor C2. The conduction of transistor Q2 generates a positive, nominally 12 volt pulse PS at the collector which is coupled to a resistor R8 and capacitor C3 connected in series to ground to form an integrator. The junction of the capacitor and resistor is joined to the base of an emitter follower transistor Q3 which generates an emission control signal Ve. The collector of transistor Q3 is connected to the positive supply by a resistor R9 and the emitter is coupled via resistors R10 to capacitor C8 which forms a low pass filter for emission control signal Ve.

As discussed previously, microprocessor 30 may access and distribute the emission control signal. However, with the emission analyzer of FIG. 1B, microprocessor 30 may derive emission control data by sampling, for example by counting pulse signal PS at the collector of transistor Q2. Thus the emission control signal may be distributed by data bus 35. In addition micro. 30 may employ suitable algorithms which allow independent control of emission control signal rise and fall times.

What is claimed is:

1. A video display apparatus, comprising:

a cathode ray tube responsive to a video signal;

a processor for controlling a bandwidth of said video signal responsive to an emission control signal; and, means coupled to said processor for generating said emission control signal responsive to a component of said video signal.

2. The apparatus of claim 1, wherein said processor reduces said bandwidth of said video signal responsive to an amplitude of said emission control signal.

3. The apparatus of claim 1, wherein said generating means forms said emission control signal from a first derivative component of said video signal.

4. A video display apparatus comprising:

a cathode ray tube responsive to a video signal;

a processor for controlling a bandwidth of said video signal responsive to an emission control signal; and, means coupled to said processor for generating said emission control signal responsive to a component of said video signal, wherein said processor further comprises a lowpass filter for controlling said bandwidth of said video signal in accordance with an amplitude of said emission control signal.

5. A video display apparatus comprising:

a cathode ray tube responsive to a video signal;

a processor for controlling a bandwidth of said video signal responsive to an emission control signal; and, means coupled to said processor for generating said emission control signal responsive to a component of said video signal, wherein said generating means further comprises a scanning velocity modulation signal generator for generating and processing a scanning velocity modulation signal to form said emission control signal.

6. The apparatus of claim 5, wherein said scanning velocity modulation signal generator further comprises a filter for generating said emission control signal responsive to frequency components of said video signal occurring within a bandwidth of said filter.

7. A resolution enhancement apparatus in a video display, comprising:
- a processor receiving a video signal for display and controllably enhancing resolution of said video signal in accordance with an adjustable first control signal; and,
- a generating means receiving said video signal and generating a second control signal responsive to a component of said video signal, said second control signal being coupled to said processor to reduce resolution enhancement in accordance with a range of said second control signal.

8. The apparatus of claim 7, wherein said generating means further comprises a processor forming a first derivative of said video signal for frequency selective filtering to form said second control signal.

9. A resolution enhancement apparatus in a video display, comprising:
- a processor receiving a video signal for display and controllably enhancing resolution of said video signal in accordance with an adjustable first control signal; and,
- a generating means receiving said video signal and generating a second control signal responsive to a component of said video signal, said second control signal being coupled to said processor to reduce resolution enhancement in accordance with a range of said second control signal, wherein said generating means further comprises a scanning velocity modulation signal processor for processing said video signal to form said second control signal.

10. A video display apparatus, comprising:
- a cathode ray tube for video signal display;
- an amplifier having controllable amplification for amplifying a video signal for display by said cathode ray tube,
- a processor coupled to said amplifier for enhancing resolution of said video signal in accordance with a user defined first control signal;
- means coupled to said processor for generating a second control signal responsive to a frequency component of said video signal; and,
- said second control signal being coupled to said processor to reduce resolution enhancement in accordance with a first range of said second control signal, and said second control signal being coupled to said amplifier to reduce amplification in accordance with a second range of said second control signal.

11. The video display apparatus of claim 10, wherein said amplifier further comprises amplification controlled by negative feedback representative of electron beam current.

12. A method for emission control in a video display apparatus comprising the steps of:
- predicting from a scanning velocity modulation signal a likelihood of emission;
- generating an emission control signal in accordance with said predicted likelihood; and,
- controlling a source of said emission in accordance with said emission control signal.

* * * * *